March 17, 1964    M. W. KERN    3,124,883
EDUCATIONAL DEVICE
Filed April 27, 1961    2 Sheets-Sheet 1
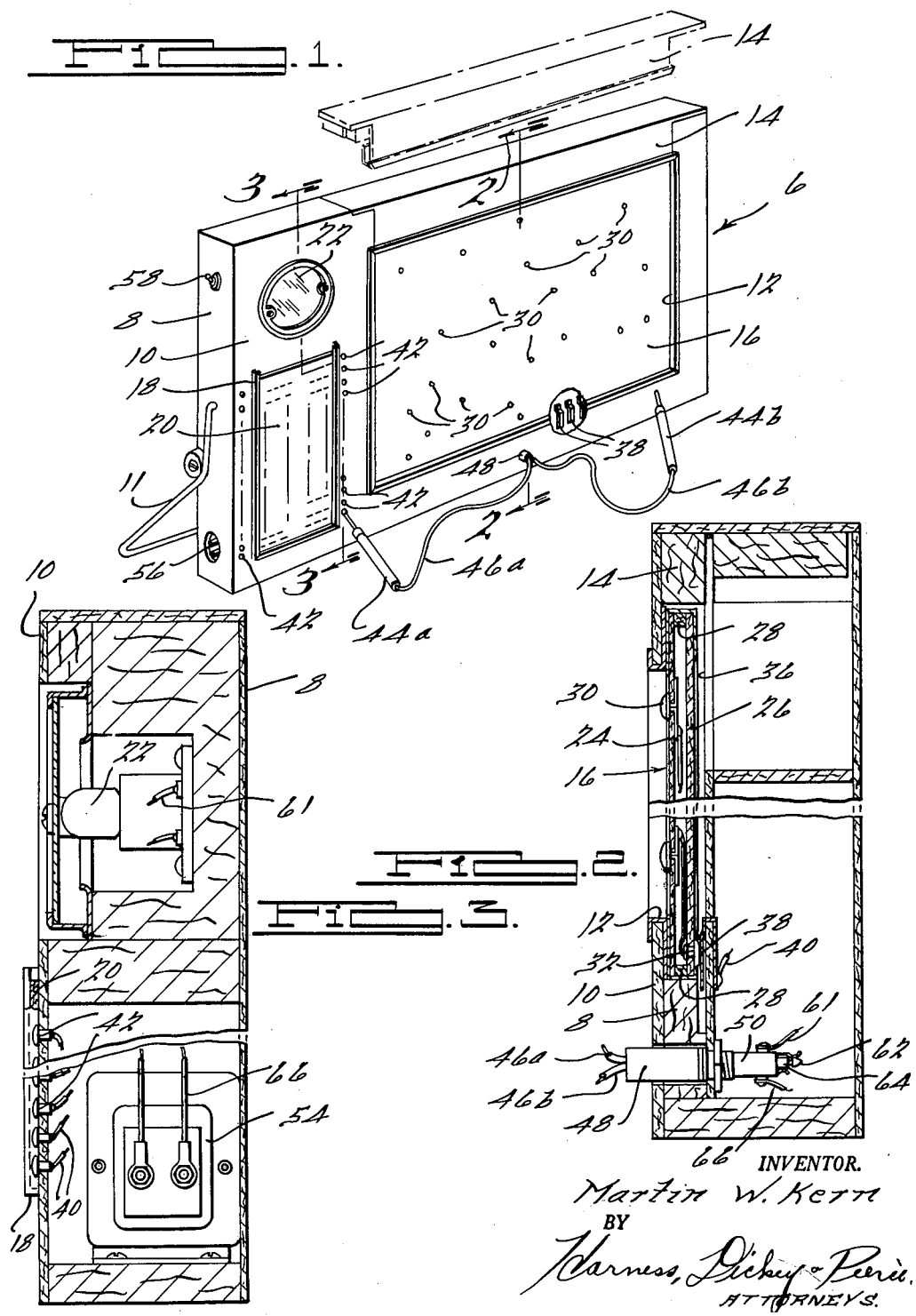
INVENTOR.
Martin W. Kern
BY
Harness, Dickey & Pierce
ATTORNEYS.

March 17, 1964    M. W. KERN    3,124,883
EDUCATIONAL DEVICE

Filed April 27, 1961    2 Sheets-Sheet 2

INVENTOR.
Martin W. Kern
BY
Harness, Dickey & Pierce
ATTORNEYS.

****

3,124,883
EDUCATIONAL DEVICE
Martin W. Kern, 24221 Parklawn, Oak Park, Mich.
Filed Apr. 27, 1961, Ser. No. 105,962
3 Claims. (Cl. 35—9)

The present invention broadly relates to an educational device and more particularly to a device which is both educational and entertaining and provides a simple and effective method for assisting young students in learning and comprehending any one of a number of subjects such as mathematics, geography, history, science, foreign languages, and the like.

A variety of games and educational devices have been heretofore proposed which have the inherent disadvantage of being relatively limited and inflexible in the way in which a variety of different subject matters can be presented for teaching a young student. For example, many of the educational devices heretofore known are provided with a fixed question and answer panel so that only one given set of facts are presented which are quickly mastered by the student thereby quickly exhausting the utility of the device. Other educational devices heretofore known have the disadvantage of enabling the student to anticipate the correct answer because of the inherent pre-arrangement of the answer and question context embodied in the educational device rather than by employing mental faculties for matching the correct answer with the question.

Accordingly, a primary object of the present invention to provide an improved educational device that provides for quick and simple interchangeability of matched pairs of question and answer panels enabling a wide range of different educational material to be portrayed thereby providing a greater degree of flexibility, versatility, and utility than educational devices heretofore known.

Another object of the present invention is to provide an improved educational device wherein the question material and answer material can be independently portrayed in the best individual arrangement for any one particular subject matter contributing toward increased learning efficiency and increased comprehension by the student.

Still another object of the present invention is to provide an educational device wherein a series of question panels can be quickly and simply interchanged thereon, each of the question panels incorporating contact means thereon for electrically connecting the question panel to the circuitry in the educational device and in appropriate indexed relationship to the answer panel thereon.

A further object of the present invention is to provide an improved educational device incorporating electrical circuitry therein for energizing an indicator light or bell when the correct answer is selected and which indicator means can be alternately energized by a self-contained power source or external power source providing for increased convenience and versatility of use.

A still further object of the present invention is to provide an improved educational device which is of simple design, of durable operation, and of relatively low cost enabling widespread use thereof in the home and in educational institutions for supplementing the education of young students in a variety of different educational subjects.

Other objects and advantages of the present invention will become apparent from the following detailed description taken in conjunction with the accompanying drawings, wherein:

FIGURE 1 is a perspective view of the educational device constructed in accordance with the preferred embodiments of the present invention and having a question panel and an answer panel removably mounted thereon;

FIG. 2 is a transverse vertical sectional view of the educational device shown in FIGURE 1 and taken along line 2—2 thereof;

FIG. 3 is a transverse vertical sectional view of the educational device shown in FIGURE 1 and taken along substantially line 3—3 thereof;

Figure 4:
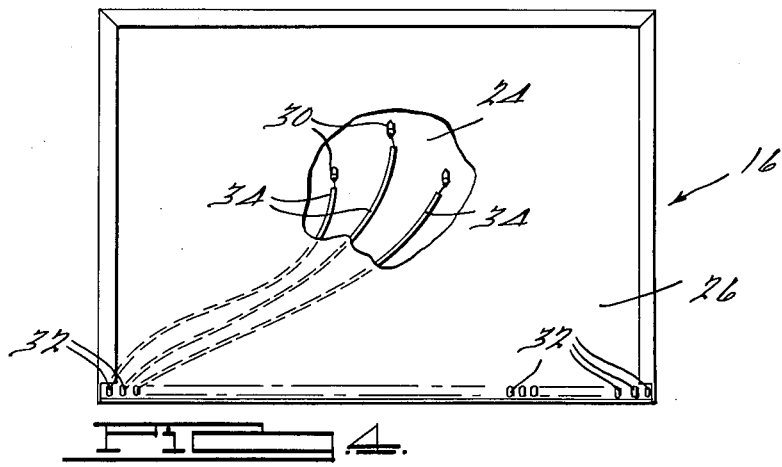
FIG. 4 is a rear elevation view partly in section of a question panel adapted to be removably disposed on the face panel of the educational device shown in FIGURE 1.

Referring now in detail to the drawings, an educational device generally indicated at 6 comprises a three-dimensional enclosure or cabinet 8 including a face panel 10 having a rectangular framed aperture 12 in the face thereof. The cabinet 8 is conveniently supported in a relatively upright position by means of a collapsible or foldable supporting leg 11 pivotally mounted at the ends of the cabinet 8. The cabinet 8 is preferably made predominantly of an electrical non-conductive material such as wood and fiberboard to facilitate the installation and insulation of the circuitry therein. The upper portion of the framed aperture 12 and the cabinet 8 as viewed in FIGURE 1 is formed by a removable cover member 14 which can be simply removed to enable interchanging of one of a series of question panels such as the question panel 16 removably mounted thereon.

An answer frame 18 is affixed to the face panel 10 having an open upper end thereof as shown in FIGURE 1 whereby one of a series of answer panels 20, each of which is matched to a corresponding one of the question panels 16 can be inserted and removably supported in the answer frame 18. A suitable indicating means such as a buzzer, for example, or a light 22 as incorporated in the exemplary embodiment of the invention shown in the drawings, is conveniently positioned on the face panel 10 for signaling the student as to the correctness of the answer selected in accordance with the circuitry of the educational device which will subsequently be described.

A typical question panel 16 as illustrated in FIGURES 1, 2 and 4 comprises a rectangular framework made of an electrical non-conductive material such as fiberboard, for example, including a front panel 24, a rear panel 26, and a spaced strip 28 disposed between the front panel 24 and rear panel 26 and extending along the edges thereof providing an interior cavity. The front surface of the front panel 24 is provided with a display of question material such as a series of mathematical problems or a map of a geographic area, for example. Each of the questions, problems, symbols, or geographical areas, and the like, on the face of the front panel 24 are associated with a question contact 30 which extends inwardly through the front panel 24 into the interior cavity of the question panel. The lower rearward edge of the question panel 16 as viewed in FIGS. 2 and 4, is provided with a series of individual spaced contacts 32 extending therealong which project inwardly through the rear panel 26 into the interior cavity of the question panel 16. Each of the question contacts 30 is electrically connected to one of the contacts 32 by means of conductors 34 electrically connected to and extending therebetween and disposed in the cavity of the question panel 16. The number of contacts 32 corresponds to the number of question contacts 30 employed, which in turn can vary depending upon the nature of the subject matter portrayed on the face of the question panel.

A selected one of a number of interchangeable question panels 16 can be simply installed in the cabinet 8 by removing the cover member 14 and sliding the question panel 16 into a recessed cavity as shown in FIG. 2 in which position the face of the question panel 16 is exposed through the frame aperture 12. When in that position, the contacts 32 along the lower rearward edge of the question panel 16 are disposed in electrical contact with a series of contact brushes 38 as may be best seen in FIGURES 1 and 2, which are mounted in spaced intervals and extend along the lower edge of the recessed cavity 36. Each of the contact brushes 38 are resiliently biased and are deflected on engagement by the contacts 32 to assure continued electrical contact therebetween. Each of the series of contact brushes 38 is electrically connected by means of conductors 40 to one of a series of answer contacts 42 arranged in two vertical rows adjacent to the sides of the answer frame 18 on the face panel 10. By this arrangement each of the question contacts 30 on the question panel 16 is directly electrically connected to a corresponding one of the answer contacts 42 disposed adjacent to the answer frame 18 through the conductors 34, contacts 32, contact brushes 38 and conductors 40.

The front face of each of the answer panels 20 is provided with two columns of symbols, words, numerals, and the like which are adapted to be aligned with respective ones of the answer contacts 42 disposed adjacent thereto and indexed so as to correspond to the correct answer for the questions represented by the question contacts electrically connected to the answer contacts. It will be apparent that the number of answer contacts 42 depends on the number of question contacts and contacts 32 on the particular question panel 16 that is used or installed and, accordingly, a surplus of answer contacts can be present which may have vacant portions on the answer panel 20 adjacent thereto or may be provided with incorrect symbols thereon to further increase the student's selectivity.

As an illustration of a typical educational exercise, the question panel 16 is provided with a map of the United States wherein each state has a question contact 30 associated therewith which in turn is electrically connected to fifty answer contacts 42 positioned in two rows of 25 contacts each along the sides of the answer frame 18. The answer panel 20 is provided with two columns containing the names of each of the states and are arranged in appropriate indexed relationship with respect to the matched pairs of question contacts and answer contacts. Matching of the answers on the answer panel 20 with the questions of the question panel 16 is achieved by the student manipulating a pair of flexible probe members 44a, 44b, which are electrically connected by conductors 46a, 46b, respectively, to a jack 48 which is removably disposed in a plug 50 provided in the face of the cabinet 8. When the student places the conductive tips of the flexible probe members 44a, 44b in electrical contact with a matched pair of an electrically connected question contact 30 and answer contact 42, the indicator light 22 is illuminated signaling the accuracy of the selection in accordance with the circuitry hereinafter described.

Figure 5:
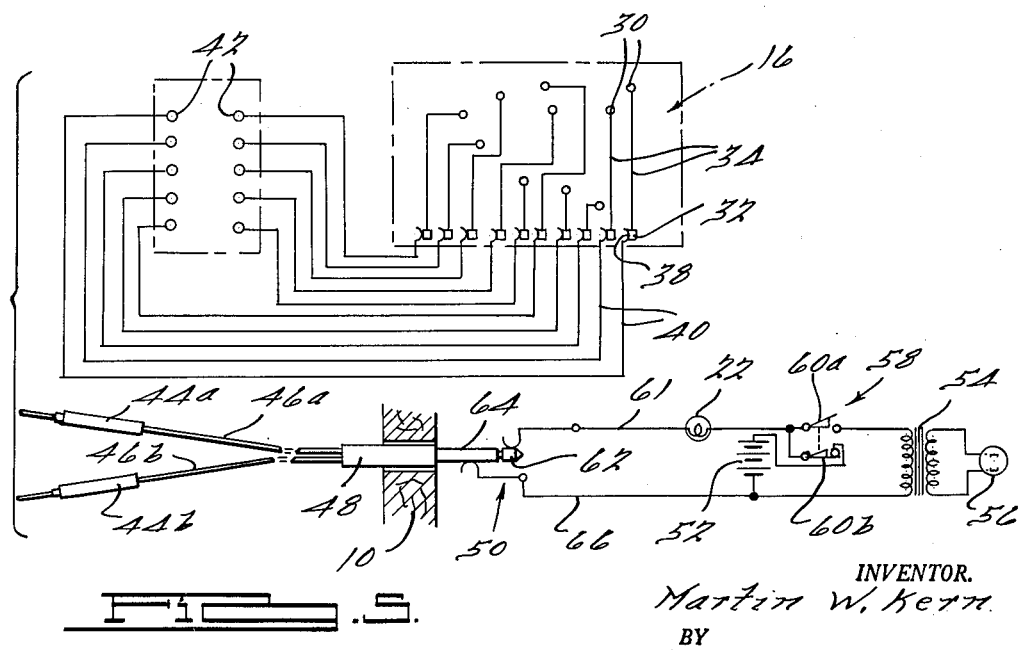
FIG. 5 is a schematic wiring diagram of the circuitry of the educational device and a question panel mounted thereon which provides for a visual or audible signal to the student when the correct answer is selected.

As may be best seen in FIGS. 2 and 3 and as schematically shown in FIG. 5, one terminal of the indicator light 22 is electrically connected to a current source such as a battery 52 which is self-contained within the cabinet 8 or to one output terminal of a step-down transformer 54 mounted within the cabinet and which is adapted to be powered by an outside power source. For this purpose a plug 56 is provided which is recessed in the left side of the cabinet as viewed in FIGURE 1 into which a suitable socket connected to an extension cord can be plugged. The selectivity between the internal and external power supply is simply achieved by a selector switch 58 including contacts 60a, 60b (FIG. 5) which on actuation are effective to alternately select power supplied from the battery 52 or the output of the step-down transformer 54, as desired. This feature enables the educational device to be energized by an external power source when convenient so as to preserve the charge of the self-contained battery 52 therein or, when employed under conditions wherein an external power source is not available or is inconvenient such as in the center of a classroom, the circuit can be energized through its self-contained battery thereby increasing the portability and versatility of the educational device.

The other terminal of the indicator light 22 is connected to the plug 50 by a conductor 61 which in turn is electrically connected to a tip portion 62 of the jack 48 which is electrically connected to the flexible probe member 44a. A shank portion 64 of the jack 48 is electrically connected to the flexible probe member 44b which is in turn electrically connected to the plug 50 that is electrically connected to the other terminal of the battery 52 and the step-down transformer 54 by a conductor 66. By this arrangement a complete circuit is provided each time the conductive tips of the flexible probe members 44a, 44b are electrically connected through the conductors connecting a matched pair of a question contact and an answer contact as schematically shown in FIG. 5.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In an educational device providing for interchangeability of matched pairs of question and answer panels, the combination comprising a cabinet including a face panel having a first frame thereon for removably receiving a question panel and a second frame for removably receiving an answer panel, a plurality of question contacts on the face of said question panel and a plurality of answer contacts on said face panel disposed adjacent to said answer panel, conductor means for electrically connecting one of each of said question contacts to a corresponding answer contact forming therewith matched pairs of contacts, said conductor means including a series of first contacts on said question panel electrically connected to said question contacts by conductors disposed beneath said face of said question panel, said first contacts disposed in electrical contact with a corresponding series of second contacts along said first frame each of which is electrically connected to said answer contacts by conductors disposed beneath the face of said face panel, electric circuit means in said cabinet including indicator means on said face panel and switching means for alternatively electrically connecting one terminal of said indicator means to a self-contained power supply and to an output terminal of a step-down transformer in said cabinet adapted to be electrically connected to an outside power supply, a pair of portable probe members electrically connected respectively to the other terminal of said indicator means and to said power supply and adapted to be manipulated and disposed in electrical contact with each contact of one of said matched pairs of contacts for energizing said indicator means.

2. In an educational device providing for interchangeability of matched pairs of question and answer panels, the combination comprising a cabinet including a face panel, a first frame on said face panel for removably receiving and mounting one of a series of interchangeable question panels, each of said question panels comprising a rectangular framework including a face surface having a plurality of question contacts thereon, a series of first contacts along one edge of said question panel, and conductor means for electrically connecting each of said question contacts to respective ones of said first contacts, said first frame having a series of second contacts along one edge thereof disposed to electrically contact respective ones of said series of first contacts, a second frame on said face panel for removably receiving and mounting one of a series of interchangeable answer panels matched to said question panel, a plurality of answer contacts on said face panel disposed adjacent to said second frame, conductor means for electrically connecting each of said answer contacts to respective ones of said second contacts whereby each of said answer contacts are electrically connected to respective ones of said question contact, provinding a series of pairs of matched contacts, each of said answer panels having a plurality of symbols thereon indexed relative to said answer contacts, indicator means on said cabinet, conductor means electrically connecting one terminal of said indicator means to a power source, and a pair of portable probe members respectively connected to the other terminal of said indicator means and said power source and adapted to be manipulated and positioned in electrical contact with one of said answer contacts and one of said question contacts whereupon on the selection of a pair of said matched contacts the electrical circuit is completed and said indicator means is energized signaling a correct association.

3. An educational device as described in claim 2 wherein said indicator means comprises a lamp for visually signaling a correct association.

References Cited in the file of this patent

UNITED STATES PATENTS

| | | |
|---|---|---|
| 1,860,895 | Marx | May 31, 1932 |
| 1,949,783 | Cleaver | Mar. 6, 1934 |
| 2,139,860 | Schwendeman | Dec. 13, 1938 |
| 2,275,988 | Parker | Mar. 10, 1942 |
| 2,442,014 | Meyer | May 25, 1948 |

FOREIGN PATENTS

| | | |
|---|---|---|
| 130,989 | Australia | May 24, 1946 |